United States Patent
Sato (10) Patent No.: US 10,705,728 B2
(45) Date of Patent: Jul. 7, 2020

(54) INFORMATION PROCESSING APPARATUS, METHOD AND PROGRAM FOR CONTROLLING THE SAME, AND STORAGE MEDIUM

(71) Applicant: CANON KABUSHIKI KAISHA, Tokyo (JP)

(72) Inventor: Masaaki Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 15/140,057

(22) Filed: Apr. 27, 2016

(65) Prior Publication Data

US 2016/0320964 A1 Nov. 3, 2016

Related U.S. Application Data

(63) Continuation of application No. 12/274,638, filed on Nov. 20, 2008, now abandoned.

(30) Foreign Application Priority Data

Dec. 27, 2007 (JP) .................. 2007-336846

(51) Int. Cl.
*G06F 3/0488* (2013.01)
*H04N 1/00* (2006.01)
*G06F 3/0482* (2013.01)

(52) U.S. Cl.
CPC ........ *G06F 3/04886* (2013.01); *G06F 3/0482* (2013.01); *H04N 1/0044* (2013.01);
(Continued)

(58) Field of Classification Search
CPC ............................. G06F 3/04886; G06F 3/0482
See application file for complete search history.

(56) References Cited

U.S. PATENT DOCUMENTS 6,026,187 A * 2/2000 Siegel .................. G06F 17/211
345/629
6,107,994 A 8/2000 Harada et al.
(Continued)

FOREIGN PATENT DOCUMENTS

JP 04-195625 A 7/1992
JP 6-195164 A 7/1994
(Continued)

OTHER PUBLICATIONS

Sho Tokoi; Approach for Access; Monthly ASCII. PC, ASCII Co., Ltd, Oct. 1, 1998 vol. 1 No. 5 (Partial Translation / p. 73).
(Continued)

*Primary Examiner* — William L Bashore
*Assistant Examiner* — Gregory A Distefano
(74) *Attorney, Agent, or Firm* — Canon U.S.A., Inc. IP Division (57) ABSTRACT

An input apparatus, that displays an editing screen including a keyboard on a display unit, includes a display control unit and a determination unit. The display control unit is configured to cause the display unit to display an input screen including at least an input item in which data is input via the keyboard thereon. The determination unit is configured to determine, based on the input item, that is a target in which data is input via the keyboard, whether a key for accepting an instruction to change the input item, that is a target in which data is input via the keyboard, to a next input item is to be displayed together with the keyboard on the display unit.

18 Claims, 11 Drawing Sheets

(52) U.S. Cl.
CPC ..... *H04N 1/00384* (2013.01); *H04N 1/00408* (2013.01); *H04N 1/00411* (2013.01); *H04N 1/00421* (2013.01); *H04N 1/00432* (2013.01); *H04N 1/00472* (2013.01); *H04N 1/00474* (2013.01); *H04N 1/00482* (2013.01); *H04N 2201/0094* (2013.01); *H04N 2201/3276* (2013.01)

(56) References Cited

U.S. PATENT DOCUMENTS

| | | | | |
|---|---|---|---|---|
| 6,564,375 | B1* | 5/2003 | Jiang | G06F 9/4446 707/999.103 |
| 7,111,243 | B1* | 9/2006 | Ballard | G06F 8/38 707/999.102 |
| 2003/0222908 | A1* | 12/2003 | Bybee | G06F 9/453 715/749 |
| 2007/0040813 | A1 | 2/2007 | Kushler et al. | |
| 2008/0122796 | A1* | 5/2008 | Jobs | G06F 3/0488 345/173 |

FOREIGN PATENT DOCUMENTS

| | | |
|---|---|---|
| JP | 2001-147756 A | 5/2001 |
| JP | 2001-331261 A | 11/2001 |
| JP | 2001-356870 A | 12/2001 |
| JP | 2001-358864 A | 12/2001 |
| JP | 2005-165562 A | 6/2005 |
| JP | 2005-286835 A | 10/2005 |
| JP | 2007-156981 A | 6/2007 |

OTHER PUBLICATIONS

Functional Visual Guidebook, Windows Vista / DOS/ V Power Report Editorial Department, Impress Japan Co., Ltd, Apr. 1, 2007 (Full Translation).

Kiyoshi Sato; Validate Palm-size PC; Mobile PC, SOFTBANK Co., Ltd, Jun. 1, 1998 vol. 4 No. 6 (Partial Translation / p. 62-63).

Shinichi Yamazaki; Notification of Reasons for Refusal; JP Application No. 2007-336846; dated Jan. 19, 2012; Patent Law Section 29(20) and 36; pp. 1-4.

* cited by examiner

ITEM INPUT SCREEN — 101

- DOCUMENT NAME *REQUIRED
  - WORK A — 1010
- INDEX *REQUIRED
  - PUBLIC ▼
- KEYWORD *OPTIONAL
- SIGNIFICANCE *REQUIRED
  - NORMAL ▼
- COMMENT *REQUIRED

FIG. 5

<INPUT-ITEM MANAGEMENT TABLE>

| INPUT SPECIFYING SCREEN | INPUT ITEM NAME | REQUIRED/ OPTIONAL | TYPE | ORDER | INITIAL VALUE |
|---|---|---|---|---|---|
| LOGIN | LOGIN NAME | REQUIRED | TEXT | 1 | |
| LOGIN | PASSWORD | REQUIRED | TEXT | 2 | |
| ITEM INPUT SCREEN | DOCUMENT NAME | REQUIRED | TEXT | 1 | WORK A |
| ITEM INPUT SCREEN | INDEX | REQUIRED | PULL-DOWN | - | |
| ITEM INPUT SCREEN | KEYWORD | OPTIONAL | TEXT | 3 | |
| ITEM INPUT SCREEN | SIGNIFICANCE | REQUIRED | PULL-DOWN | - | |
| ITEM INPUT SCREEN | COMMENT | REQUIRED | TEXT | 2 | |
| | | | | | |
| | | | | | |

ITEM INPUT SCREEN — 101

- DOCUMENT NAME  *REQUIRED
  - WORK A — 1010
- INDEX  *REQUIRED
  - PUBLIC ▼
- KEYWORD  *OPTIONAL
- SIGNIFICANCE  *REQUIRED
  - NORMAL ▼
- COMMENT  *REQUIRED

FIG. 13
PRIOR ART

ITEM INPUT SCREEN — 101

- DOCUMENT NAME  *REQUIRED
- INDEX
- KEYWORD
- SIGNIF...
- NORMAL ▼
- COMMENT  *REQUIRED

102

WORK A — 1020

| A | B | C | BACK SPACE |

CONVERT

INFORMATION PROCESSING APPARATUS, METHOD AND PROGRAM FOR CONTROLLING THE SAME, AND STORAGE MEDIUM

CROSS-REFERENCE TO RELATED APPLICATIONS

This application is a Continuation of U.S. application Ser. No. 12/274,638, filed Nov. 20, 2008, which claims priority from Japanese Patent Application No. 2007-336846 filed Dec. 27, 2007, which are hereby incorporated by reference herein in their entireties.

BACKGROUND OF THE INVENTION

Field of the Invention

The present invention relates to an information processing apparatus, a method and a program for the same, and a storage medium.

Description of the Related Art

One example of information processing apparatuses is multifunction devices, that is, multifunction peripherals that incorporate the functionality of image forming apparatuses in one, such as printers, copy machines, and facsimile machines. Since multifunction devices perform jobs using the incorporated multiple functions, entry jobs that the user must do in front of the devices have been significantly increasing.

For example, when the user reads a document using the scanner function of a multifunction device, sends the read document using a transmitting function, and prints it by the multifunction device, the user needs to set the parameters of the individual functions. Specifically, for the document reading function, the user inputs values for reading the document, such as values of resolution, color density, and color or monochrome. For the transmitting function, the user inputs a destination address, the title of the document to be sent, a comment for the document, and so on. For the print function, the user inputs the size and kind of the sheet, and so on. For a box function for storing documents, the user inputs the name, keyword, comment, index, and significance of a document to be stored. The parameters for reading and printing documents depend on the capability of multifunction devices and are provided as values of choices or lists of choices in pull-down menus. Parameters for transmission are provided as text entry fields for the user to input text data, the values of choices or a list of choices in a pull-down menu.

When the physical size of a display section (a display) provided for the user is limited, a software keyboard (for example, refer to Japanese Patent Laid-Open No. 6-195164) is provided for the user to enter in text entry fields. The software keyboard is a keyboard displayed on a display screen. The user can input items as in keyboard typing by operating key objects on the software keyboard.

However, the above-described related-art technique is configured such that when the user finishes entry in a first text entry field and then selects a second text entry field for entry using a software keyboard, the software keyboard is always closed temporarily and, thereafter, displayed again when the user selects the second text entry field. In other words, if more than one item must be input, the user needs to repeatedly execute the operation of displaying and undisplaying the software keyboard, [selecting an input item→inputting a text on a software keyboard displayed→closing the software keyboard]. This requires much time and effort to input in text fields. If more than one text entry field are displayed to allow selection of a text entry field, with a software keyboard displayed, the user can continue input without closing the software keyboard temporarily. However, display sections of multifunction devices are generally small. Accordingly, a large screen is necessary to display both a software keyboard and text entry fields.

Figure 12:
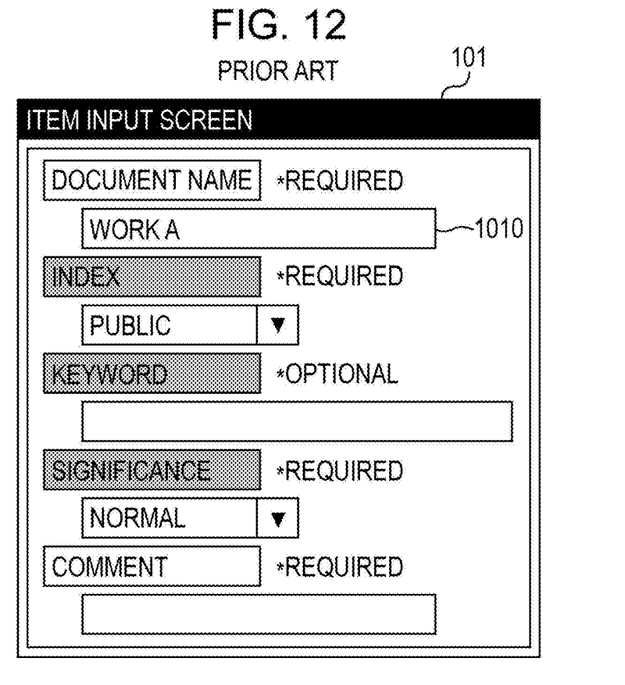
FIG. 12 shows a software keyboard for inputting text-type data of a related art is displayed.
Figure 13:
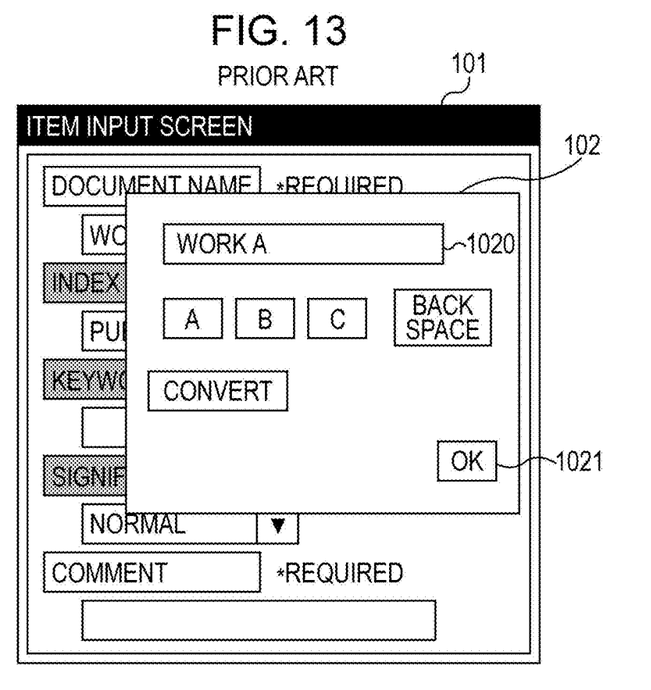
FIG. 13 shows a software keyboard for inputting text-type data of the related art is displayed.

FIG. 12 is an image diagram showing an example for describing the above-described problem. Reference numeral 101 denotes an item input screen that shows a plurality of text entry field items and selection items using pull-down menus. Referring to FIG. 13, a software keyboard 102 is displayed when the user designates a text entry field ("Document Name") 1010 on the item input screen 101 so that a value can be input in a text entry field 1020. When the user inputs a desired value in the text entry field 1020 and presses an OK key 1021, the software keyboard 102 is closed. When the software keyboard 102 is closed, the value that the user inputs in the text entry field 1020 is input in the document-name text entry field 1010 and the item input screen 101 is displayed (FIG. 12).

Figure 14:
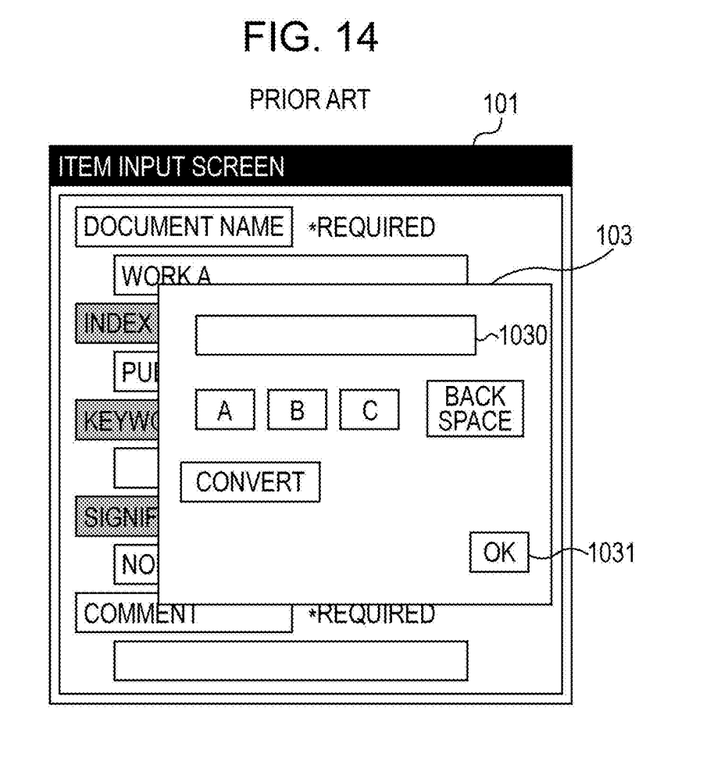
FIG. 14 shows a software keyboard for inputting text-type data of the related art is displayed.

Next, the user can select a desired item on the item input screen 101 to input or set an attribute. Referring to FIG. 14, a software keyboard 103 is displayed when the user designates another text entry field ("Keyword") on the item input screen 101. This shows a state in which the user can input a value in a text entry field 1030. When the user inputs a desired value in the text entry field 1030 and presses an OK key 1031, the software keyboard 103 is closed. In this manner, the user opens and closes the software keyboard every time the user finishes entry in one text entry field and moves to the next text entry field using the software keyboard, which requires unnecessary time and effort.

SUMMARY OF THE INVENTION

The present invention provides an information processing apparatus which overcomes the above-described problem and a method for controlling the same.

According to an aspect of the present invention, an information processing apparatus includes a processor configured to cause a display unit to display an input screen including a plurality of items in which text data can be input, to display a keyboard for inputting text data in one input item of the plurality of items so as to be superimposed on the input screen displayed by the display unit, and to display a name of the input item on the keyboard; and a control unit configured to perform control, in a case where an instruction to change the input item to a different item is received, with the keyboard superimposed on the display unit, so as to change the input item to the different item, with the keyboard kept displayed on the display unit, and cause the display unit to display the name of the different item.

Further features and aspects of the invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE EMBODIMENTS

Embodiments of the present invention will be described with reference to the drawings.

Description of Multifunction Device

Figure 1:
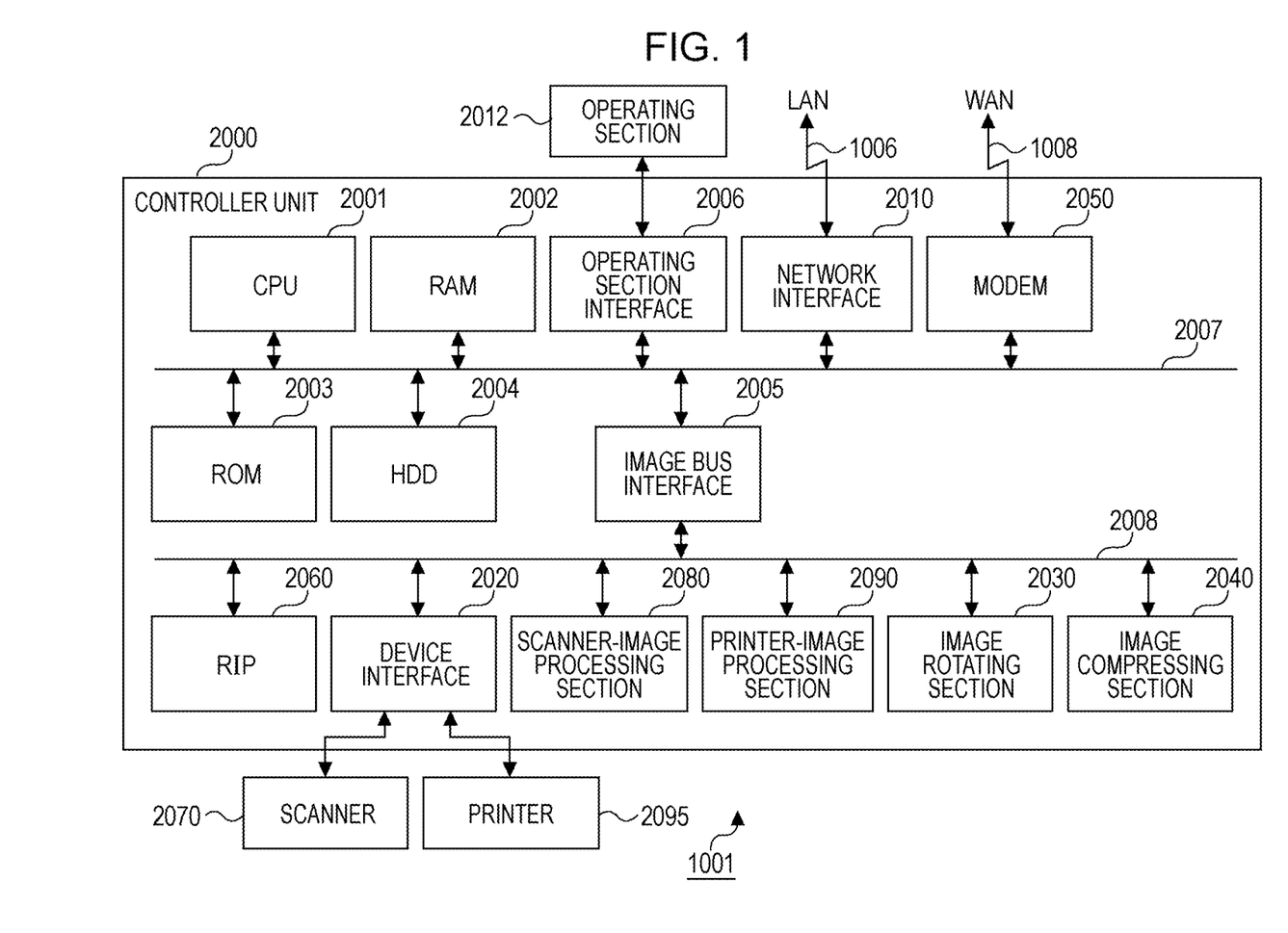
FIG. 1 is a block diagram showing a configuration of the main components of a copy machine.

FIG. 1 is a block diagram showing the configuration of the main components of a multifunction device (hereinafter simply referred to as a copy machine) 1001 as an example of an information processing apparatus.

The copy machine 1001 includes a controller unit 2000. The controller unit 2000 is connected to a scanner 2070 which is an image input device, a printer 2095 which is an image output device, and an operating section 2012. The operating section 2012 includes a display section for displaying screens shown in FIG. 3 and FIGS. 7 to 13. The display section is, but not necessarily, a touch-panel LCD or the like; it may be an organic EL or a plasma display. The controller unit 2000 includes a CPU 2001. The CPU 2001 boots up an operating system (OS) according to a boot program stored in a ROM 2003. The CPU 2001 executes application programs stored in a hard disk drive (HDD) 2004 on the OS to execute various processes. The HDD 2004 stores a program for implementing an item input device of the invention. The CPU 2001 uses a RAM 2002 for its work area. The RAM 2002 provides the work area and also an image memory area for temporarily storing image data. The HDD 2004 stores the application programs and image data. The CPU 2001 is connected to the ROM 2003 and the RAM 2002 and also to an operating section interface 2006 and a network interface 2010 over a system bus 2007. The CPU 2001 is also connected to a modem 2050 and an image bus interface 2005.

The operating section interface 2006 is an interface to the operating section 2012 having a touch panel and outputs image data to be displayed on the operating section 2012 to the operating section 2012. The display of the operating section 2012 is controlled by the CPU 2001 via the operating section interface 2006 according to a program stored in the HDD 2004. Examples of image data to be displayed are the images shown in FIGS. 3 and 4 and FIGS. 8 to 14. The operating section 2012 displays more than one item to be input, a keyboard, a text display area, and "Forward" key and "Back" key for selecting another item. The operating section interface 2006 sends information input by the user at the operating section 2012 to the CPU 2001.

The network interface 2010 is connected to a LAN 1006 and inputs and outputs information to/from various units on the LAN 1006. For example, the network interface 2010 is used to transmit and receive emails and files and to print content from the Web. The modem 2050 is connected to a public line 1008 and transmits and receives facsimile information over the public line 1008.

The image bus interface 2005 is a bus bridge that connects the system bus 2007 and an image bus 2008 that transfers image data at a high speed, for converting the data format. For example, the image bus 2008 may be a PCI bus or an IEEE1394 bus. On the image bus 2008 are provided a raster image processor (hereinafter referred to as RIP) 2060, a device interface 2020, a scanner-image processing section 2080, a printer-image processing section 2090, an image rotating section 2030, and an image compressing section 2040. While the controller unit 2000 uses two buses, the system bus 2007 and the image bus 2008, for example, the invention is not limited to that. The system bus 2007 and the image bus 2008 may be integrated to a single bus or, alternatively, three or more buses may be used.

The RIP 2060 is a processor that opens up PDL code to a bitmap image. The device interface 2020 is connected to the scanner 2070 and the printer 2095 and performs synchronous or asynchronous conversion of image data. The scanner-image processing section 2080 corrects, processes, and edits input image data. The printer-image processing section 2090 corrects print-output image data and converts the resolution thereof according to the printer 2095. The image rotating section 2030 rotates image data. The image compressing section 2040 compresses multivalued image data to JPEG data and binary image data to JBIG data, MMR data, or MH data and expands them.

The controller unit 2000 performs the control described below. The controller unit 2000 performs control for implementing a copy function to print image data read by the scanner 2070 using the printer 2095. The controller unit 2000 also performs control for transmitting and receiving image information and device-status information by connecting to the LAN 1006 or the public line 1008 (WAN). Furthermore, the controller unit 2000 performs control for opening up received print data to a bitmap image using the RIP 2060 and printing it.

Figure 2:
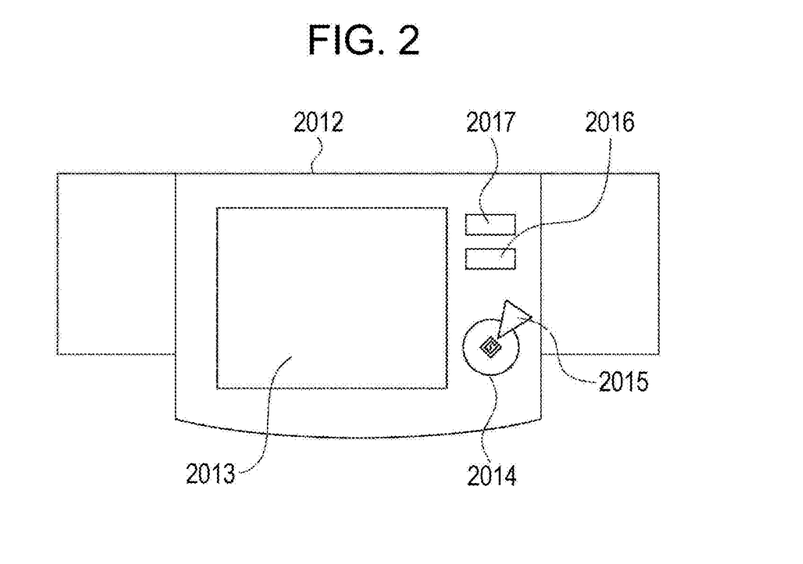
FIG. 2 is an exemplary structure of an operating section shown in FIG. 1.

FIG. 2 is a plan view showing the structure of the operating section 2012 shown in FIG. 1.

Figure 3:
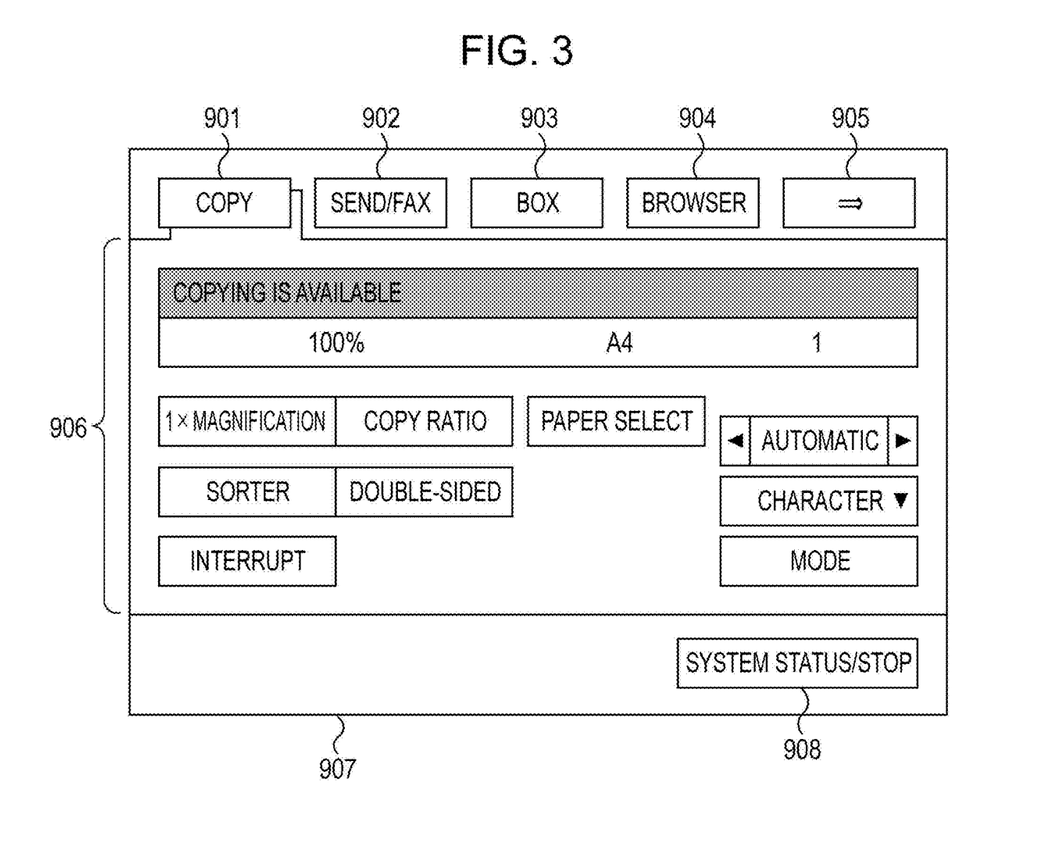
FIG. 3 is a diagram showing an example of an operating screen displayed on the operating section.

An LCD display section 2013 is controlled by the CPU 2001 according to a program stored in the HDD 2004. The LCD display section 2013 has a structure in which a touch panel is bonded on an LCD. The LCD display section 2013 displays a copy-machine operating screen as shown in FIG. 3, with the copy machine 1001 in a waiting state. When the user touches a key displayed on the operating screen, position information thereof is transmitted to the CPU 2001. Reference numeral 2014 denotes a start key, which is used to start a document reading operation. Reference numeral 2015 denotes a stop key, which is operated to stop an action. Reference numeral 2016 denotes an ID key, which is used to input a user ID. Reference numeral 2017 denotes a reset key, which is used to initialize setting of the operating section 2012 (setting of the number of copies and the like).

FIG. 3 shows one example of the operating screen displayed on the operating section 2012 while the copy machine 1001 is in the waiting state. This operating screen is produced by the CPU 2001 according to a program stored in the HDD 2004. This also applies to various screens described hereinafter.

The operating screen of the operating section 2012 displays, at the upper part, touch keys of a copy tab 901, a send/fax tab 902, a box tab 903, a browser tab 904, and a right-arrow tab 905 for use in selecting additional functions.

FIG. 3 shows a copy-function initial screen while the copy machine 1001 is in the waiting state or when the touch key of the copy tab 901 is pressed. The copy function is displayed in an area 906. The status of the copy function is displayed at the upper part of the area 906, in which "Copying is available" is displayed. Below the status, a percentage, a sheet size, and the number of sheets are displayed. Furthermore, touch keys for setting the copy-function operation mode, such as 1× magnification, copy ratio, paper select, sorter, double-sided, interrupt, color density control, and character, are arranged. A left-arrow key for decreasing the color density, a right-arrow key for increasing the color density, and an automatic key for automatically controlling the color density are displayed. Screens for designating operation modes that cannot be displayed on the initial screen are displayed hierarchically in the area 906 by pressing a mode key.

A display area 907 is an area for displaying the status of the copy machine 1001. For example, an alarm message, such as a jam alarm, and a status message that PDL printing is being performed, if executed, are displayed. The display area 907 also displays a system status/stop touch key 908. When the system status/stop touch key 908 is pressed, a screen that displays the device information of the copy machine 1001 and a screen that displays a print job status (not shown) are displayed. This screen allows the user to stop the job.

When the send/fax tab 902 is pressed, a screen for sending an image read by the scanner 2070 is displayed. This screen allows the user to select a transmission using an E-MAIL protocol or an FTP protocol for sending an image to a device on the LAN 1006 or a facsimile transmission using the public line 1008.

When the box tab 903 is pressed, the following setting screen is displayed: a setting screen (not shown) for storing an image read on the copy machine 1001 into a box area in the HDD 2004, designating image data stored in the box area and printing it, or sending an image to a device on the LAN 1006, as described above. When the browser tab 904 is pressed, a screen for entering URL for acquiring data, a screen for designating to store data acquired from entered URL, or a screen for designating printing is displayed.

When the controller unit 2000 has five or more functions, the following screen is displayed. That is, a right-arrow key 905 is displayed on the right of the four function tabs 901 to 904 of COPY, SEND/FAX, BOX, and BROWSER. When the right-arrow key 905 is pressed, a screen for another function is displayed.

Figure 4:
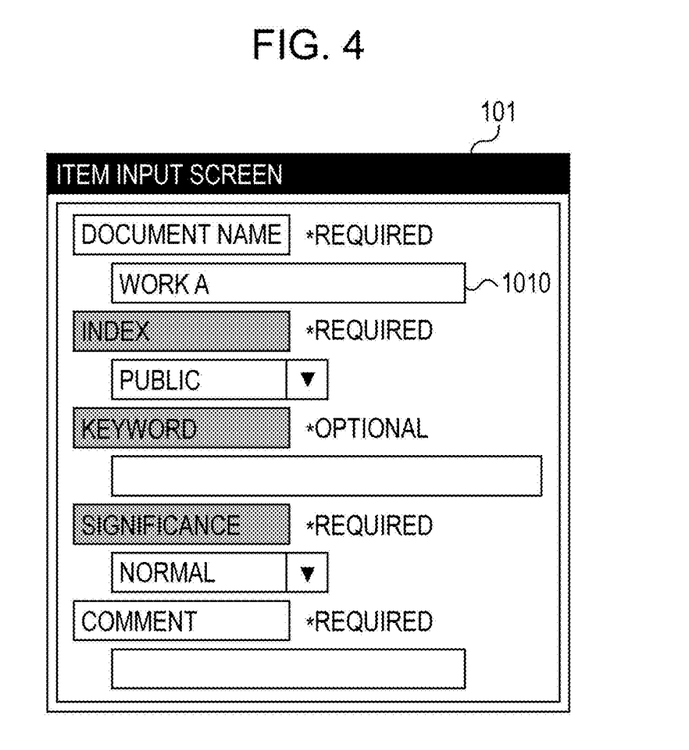
FIG. 4 is a diagram showing an example of an item input screen.

FIG. 4 shows an item input screen 101 in which input items displayed on the LCD display section 2013 are displayed. The item input screen 101 displays an example of text entry fields and option items using a pull-down menu. This operating screen is produced by the CPU 2001 according to a program stored in the HDD 2004. This also applies to various screens described hereinbelow. When the send/fax tab 902, the box tab 903, or the browser tab 904 is pressed, a screens for entering an item, such as the address of email, a subject, or an image to be stored in the box is displayed.

Figure 5:
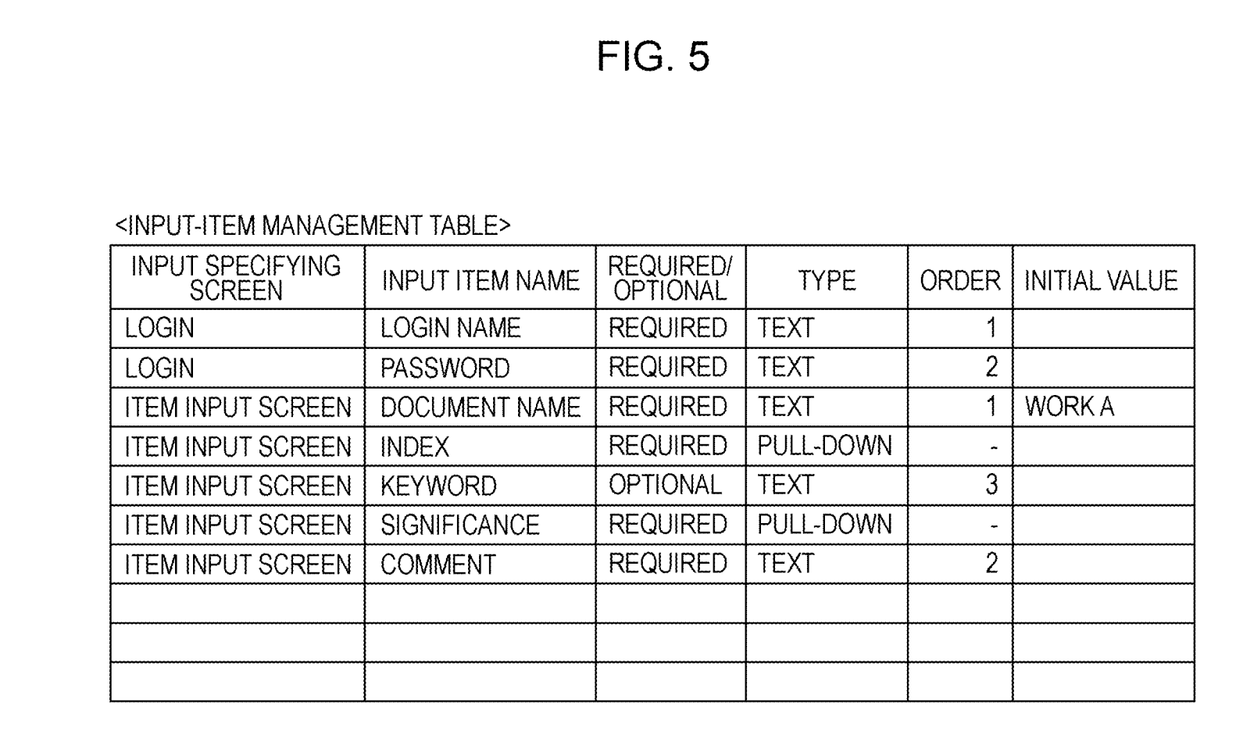
FIG. 5 shows an item-entry-field management table.

FIG. 5 shows an item-entry-field management table which is used to input the items displayed on the item input screen 101 in FIG. 4. The management table will be described in detail. "Input specifying screen" indicates a displayed screen. FIG. 4 shows a state in which "Item input screen" in FIG. 5 is displayed. Another example of an input specifying screen is a screen for the user to logs in. "Input item name" indicates the name of an input item. "Required/optional" indicates whether entry of an item indicated by the input item name is required or optional. "Type" indicates the type of data that is input to the item indicated by the input item name. For items described as "Text", text data, such as alphabets, kana, or kanji, is entered on a software keyboard. For items described as "Pull-down", the user selects corresponding data from a pull-down menu when inputting data to the item indicated by "Input item name". "Order" indicates an order selected as an input item. "Initial value" indicates an initial value to display a specified input item. When an input item having an initial value is selected, the initial value is displayed in the text field in a state in which no text data has been input. The purpose of using the items has been described above. Although not shown, a table listing of input items on the waiting screen in FIG. 3 is similar to the item input screen and a login screen.

Figure 6:
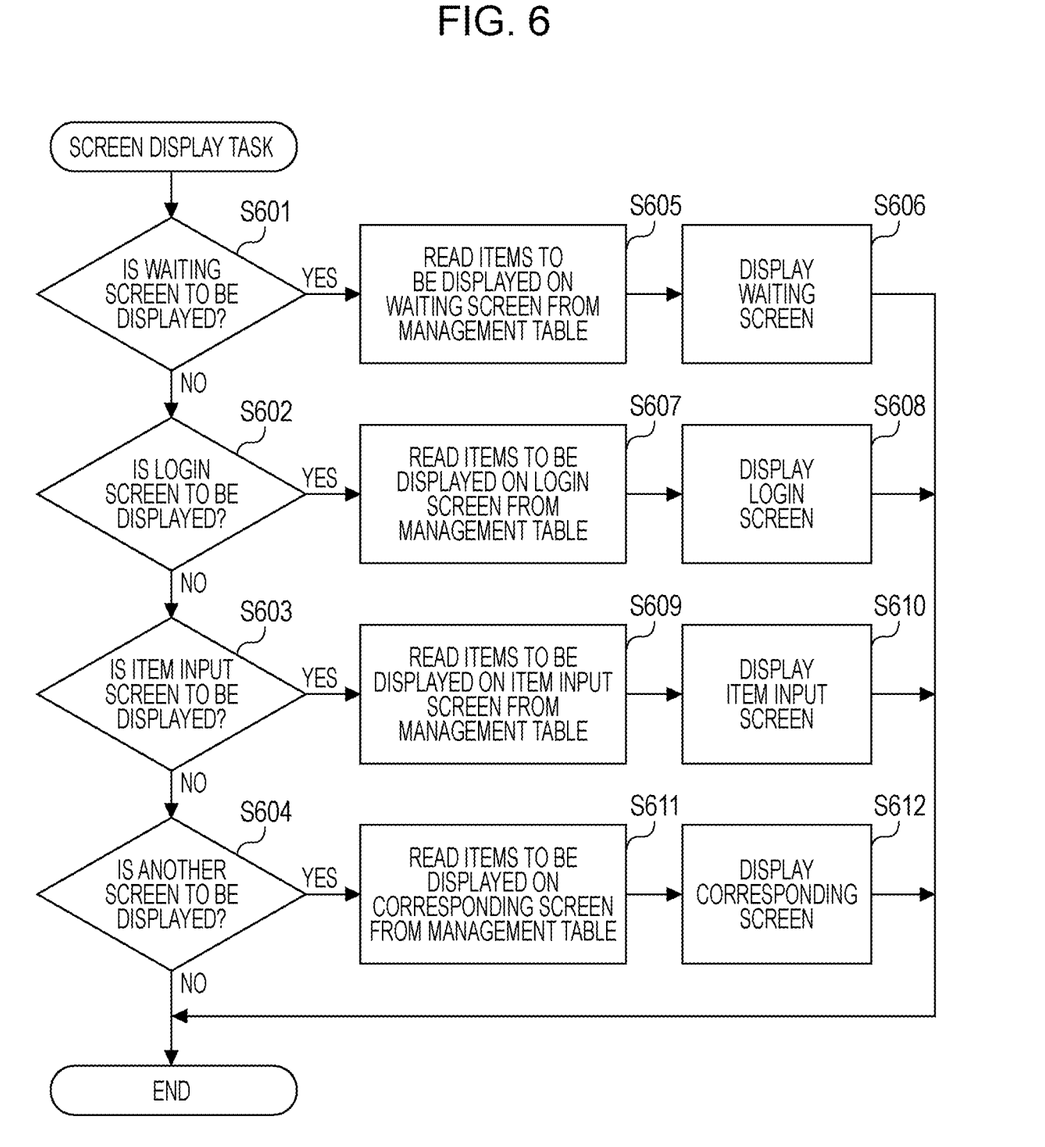
FIG. 6 shows a flowchart for a screen display task.

FIG. 6 shows the task of selecting a screen to be displayed on the LCD display section 2013 of the operating section 2012. The CPU 2001 executes the flowchart shown in FIG. 6 according to a program stored in the HDD 2004.

When the screen display task is started, the CPU 2001 determines whether it is the task of displaying the waiting screen (step S601). If it is determined that it is the task of displaying the waiting screen, then the CPU 2001 reads the management table shown in FIG. 5 (step S605) and displays the item entry fields (step S606). If it is determined that the waiting screen is not to be displayed, then the CPU 2001 determines whether to display the login screen (step S602). If it is determined that the login screen is to be displayed, then the CPU 2001 reads the management table shown in FIG. 5 (step S607) and displays item entry fields (step S608). If it is determined that the login screen is not to be displayed, then the CPU 2001 determines whether to display the item input screen (step S603). If it is determined that the item input screen is to be displayed, then the CPU 2001 reads the management table shown in FIG. 5 (step S609) and displays item entry fields (step S610). On the other hand, if it is determined that item entry fields are not to be displayed, then the CPU 2001 determines whether it is the task of displaying another screen (step S604). If it is the task of displaying another screen, then the CPU 2001 reads the management table shown in FIG. 5 (step S611) and displays item entry fields (step S612). In contrast, if it is not the task of displaying another screen, then the CPU 2001 terminates the screen display task.

Figures 7, 7A:
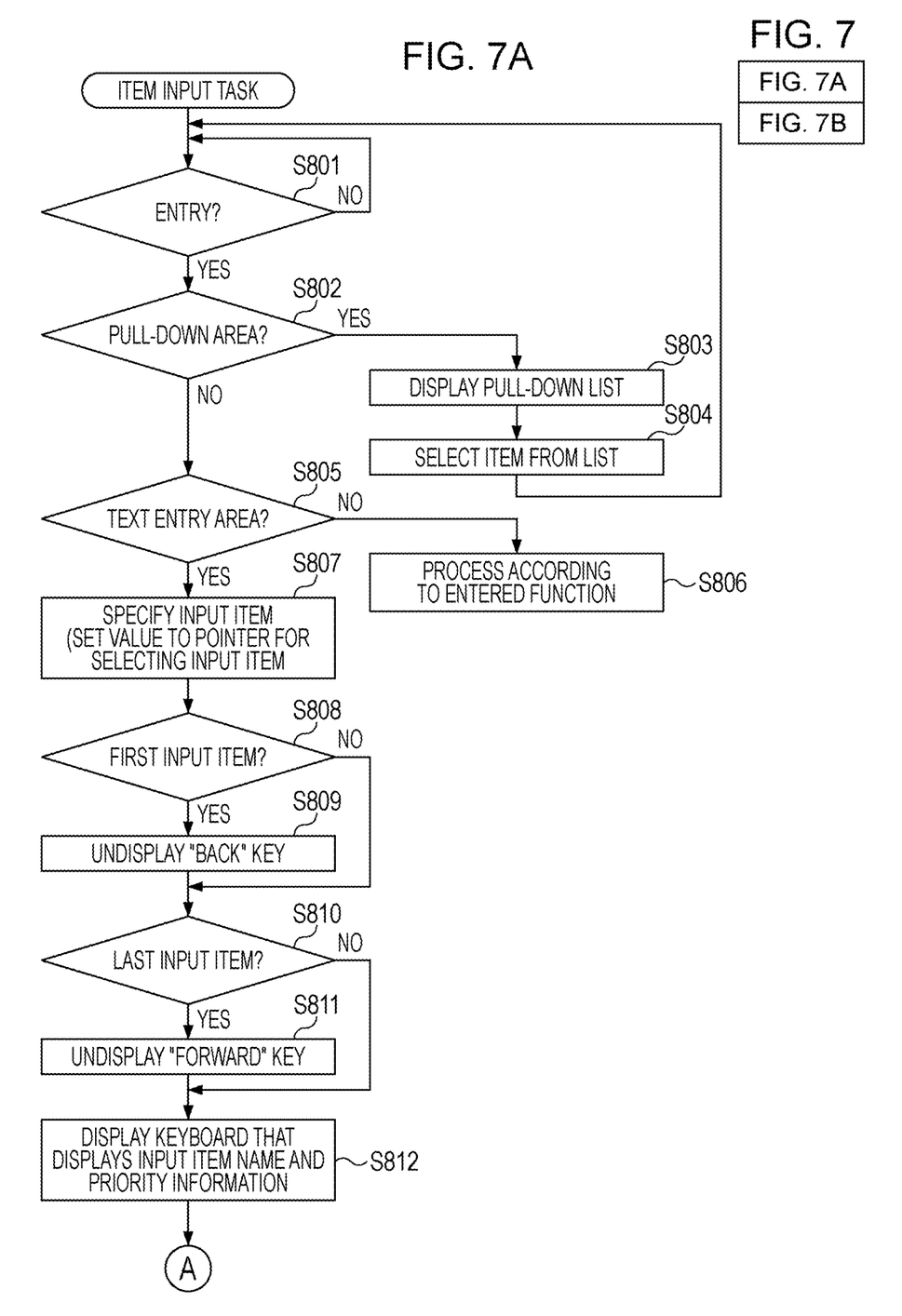
FIG. 7A shows the first part of a flowchart for an item input task.
Figure 7B:
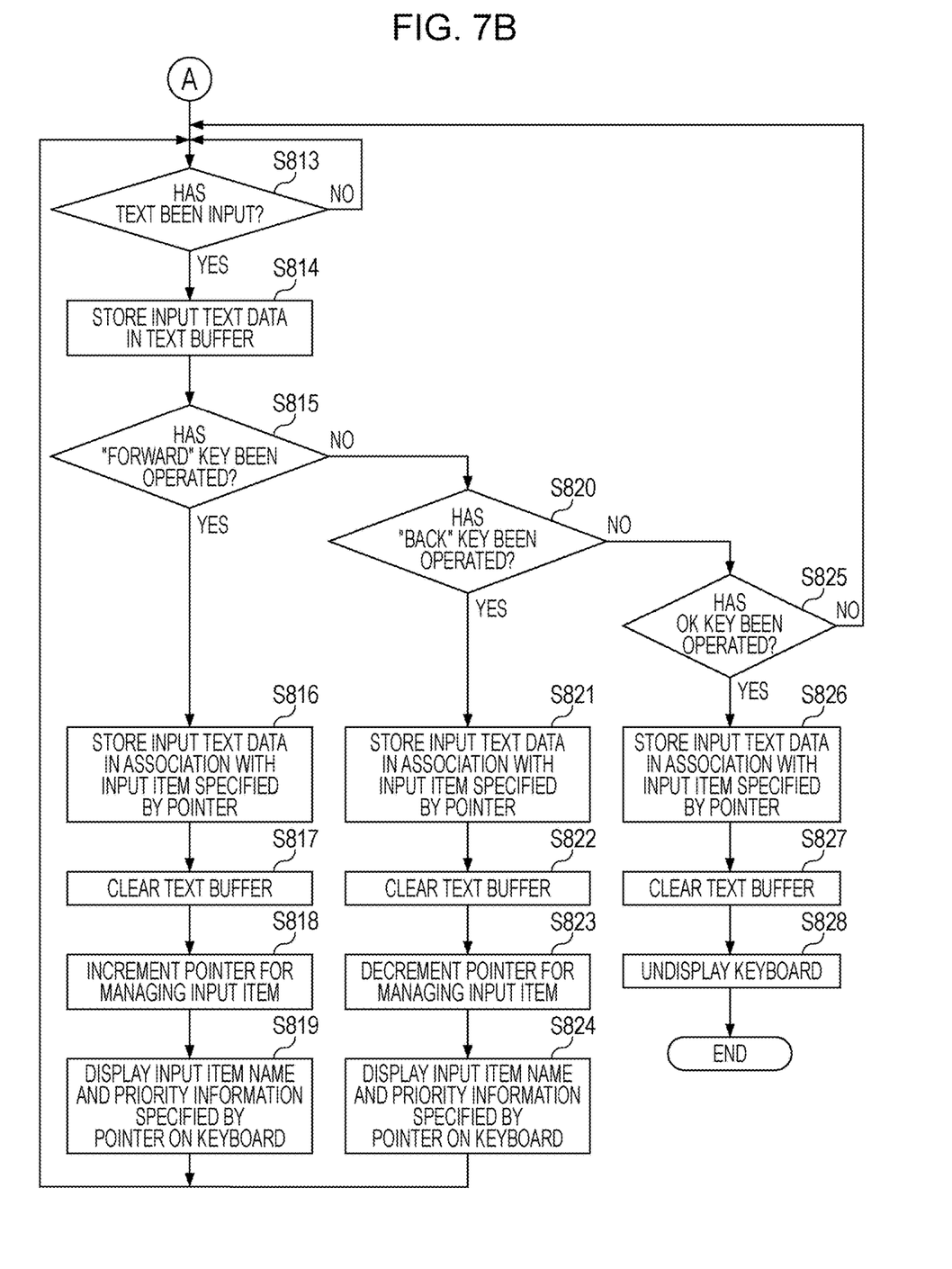
FIG. 7B shows the second part of a flowchart for an item input task.

FIG. 7A and FIG. 7B show the task of inputting data in the individual item entry fields on the screens displayed by the screen display task in FIG. 6. The CPU 2001 executes the flowchart shown in FIGS. 7A and 7B according to a program stored in the HDD 2004.

When the item input task is started, the CPU 2001 determines whether an entry has been made (step S801). Whether an entry is made or not is determined depending on whether a corresponding item entry field is touched or a cursor (not shown) has moved to a corresponding item entry field. The specification of an input item by moving a cursor or touching will not be described in detail because it is well known.

Next, the CPU 2001 determines whether the type of the input item is the pull-down type shown in FIG. 5 (step S802). If it is the pull-down type, then the CPU 2001 displays a pull-down list (step S803) to allow the user to select a desired choice from the list (step S804). When the user selects a choice from the list, the program returns to step S801. In contrast, if it is not the pull-down type, then the CPU 2001 determines whether the type of the input item is the text type (the text field) shown in FIG. 5. If it is not the text type, then the CPU 2001 input an item according to the input value. In contrast, if it is the text type, then the CPU 2001 sets a pointer for selecting an input item (step S807). Here, the data indicative of the order, shown in FIG. 5, is set for the pointer. In this embodiment, an input item can be moved to another item from the selected item by increasing or decreasing the value of the pointer.

Next, the CPU 2001 determines whether the specification of the text input field in the displayed screen is made for the first time (step S808). If it is the first time, "Back" key for returning to the previously input item is not displayed (step S809). Likewise, the CPU 2001 determines whether it is the last input item (step S810). If it is the last input item, "Forward" key for moving to the next input item is not displayed, as shown in FIG. 10 (step S811).

Here, the CPU 2001 determines whether it is the last input item depending on whether all the other input items have been input. It may be determined from the data indicative of the order, shown in FIG. 5.

Figure 9:
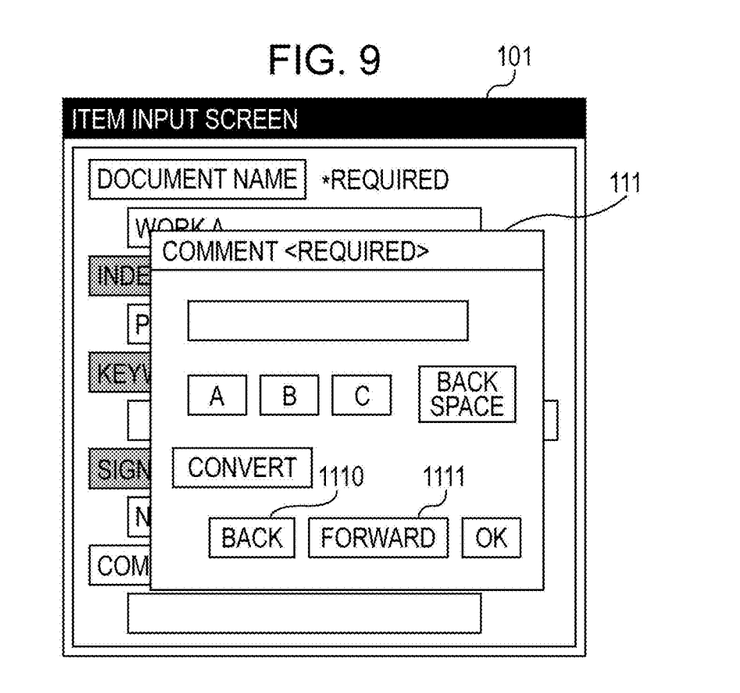
FIG. 9 shows a software keyboard for inputting text-type data of the invention is displayed.

If it is neither the first specified text field nor the last specified text field, the CPU 2001 displays both "Back" key and "Forward" key as shown in FIG. 9.

Figure 8:
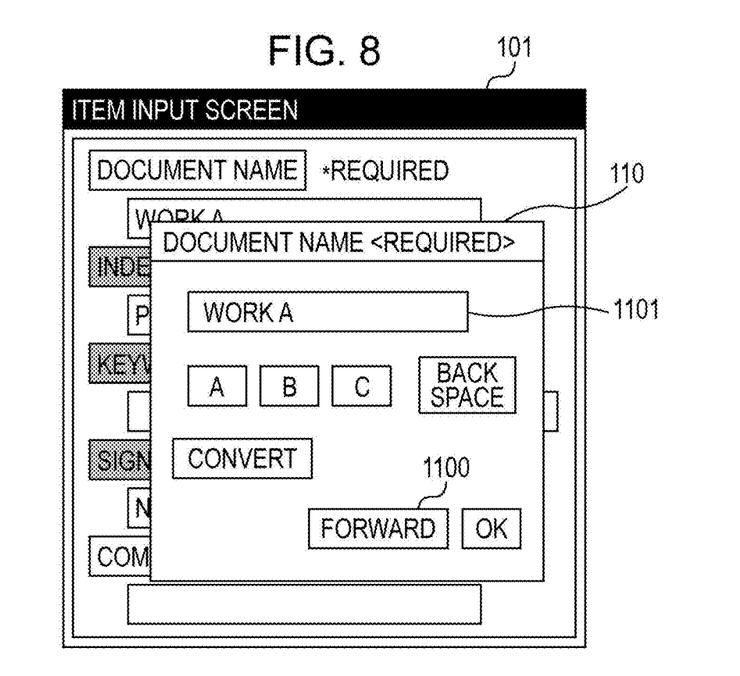
FIG. 8 shows a software keyboard for inputting text-type data of the invention is displayed.
Figure 10:
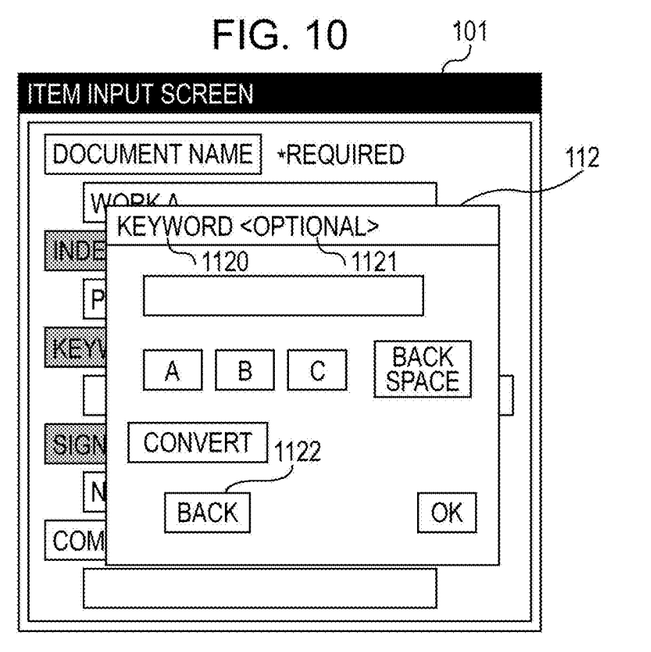
FIG. 10 shows a software keyboard for inputting text-type data of the invention is displayed.

Next, the CPU 2001 displays a keyboard for inputting characters, such as alphabets, as shown in FIGS. 8 to 10 (step S812). This keyboard displays a keyboard for inputting text, a text-data display area that displays input text data, a "Forward" key or a "Back" key for selecting another input item, and an "OK" key for confirming the input text. This keyboard also displays input item name for specifying an item input on the displayed keyboard and priority information indicative of whether the entry is required or optional. This allows the user to be informed of input item name and the order of priority of the entry even if the item input screen is hidden by the displayed keyboard. This superimposing of the item input screen that displays a plurality of item display areas and a keyboard has a remarkable merit of reducing the size of an input screen.

Examples of a keyboard for entering characters in entry areas include a well-known QWERTY keyboard and a numeric keyboard, in addition to the displayed keyboard. When text is input, the CPU 2001 stores the input text in a text buffer area in the RAM 2002 that is a temporary storage area (step S814).

Next, the CPU 2001 determines whether "Forward" key has been operated (step S815). If it is determined that "Forward" key has been pressed, then the CPU 2001 stores the data that has been input in the text buffer area serving as a temporary storage area in association with input item name that has been input (step S816). The input item name is specified by a pointer. Next, the CPU 2001 clears the text buffer to display the next input item (step S817). When the text buffer area is cleared, the CPU 2001 increments the pointer that manages the input item name and specifies the next input item (step S818). At that time, the CPU 2001 changes the input item name for specifying an item input on the keyboard and priority information to an input item name indicated by the pointer and priority information, with the keyboard kept displayed (step S819). Thus, the input item can be moved.

For example, in the case where the input item name and priority information that have been input before "Forward" key is pressed are "Document name" and "Required" of "Item input screen" shown in FIG. 5, the following display is given when "Forward" key is pressed. That is, the input item name and priority information are changed to "Comment" and "Required" according to the order data shown in FIG. 5, with the keyboard kept displayed. This eliminates the time and effort of the user to open and close the keyboard. Moreover, this has a remarkable merit of allowing the user to immediately recognize information of an input item even if an item input screen that displays a plurality of input item display areas is hidden by the displayed keyboard.

When text data has already been input and stored in the comment field, the stored text data may be displayed in the text display area.

If it is determined that the "Forward" key has not been pressed, then the CPU 2001 determines whether the "Back" key has been pressed (step S820). If it is determined that the "Back" key has been pressed, then the CPU 2001 stores the data that has been input in the text buffer area serving as a temporary storage area in association with the input item name that has been input (step S821). The input item name is specified by a pointer. Furthermore, the CPU 2001 clears the text buffer to display the previous input item data (step S817). When the text buffer area is cleared, the CPU 2001 decrements the pointer that manages the input item name and specifies the previous input item (step S822). When text data that has already been input and stored in the previous input item is present, the stored text data is displayed.

At that time, the CPU 2001 changes the input item name for specifying an input item on the keyboard and priority information to an input item name indicated by the pointer and priority information, with the display of the keyboard maintained (step S824). Thus, the input item can be moved.

If it is determined that the "Back" key has not been pressed, then the CPU 2001 determines whether the "OK" key has been pressed (step S825). If it is determined that the "OK" key has been pressed, then the CPU 2001 stores the data that has been input in the text buffer area serving as a temporary storage area in association with the input item name that has been input (step S826). Then, the CPU 2001 clears the text buffer (step S827). When the text buffer area is cleared, the CPU 2001 undisplays the keyboard (step S828) and terminates this process. When it is determined that the "OK" key has not been pressed, the program returns to step S813.

After the process has been finished, the text data stored in steps S816, S821, and S826 may be displayed on the item input screen. That is, the text data, such as "Document name", "Keyword", and "Comment", may be displayed in the text entry fields on the item input screen 101 shown in FIG. 4. This offers a remarkable merit that the user can confirm all the input items at a glance.

Here, although an example is described in which text-type input items are displayed in sequence using the order data shown in FIG. 5 so that an input item is changed, with the keyboard kept displayed, the invention is not limited to that.

The user operation of opening and closing the software keyboard can be decreased using only the type data shown in FIG. 5 without using order data. The CPU 2001 executes the following process according to a program stored in the HDD 2004.

For example, if the CPU 2001 determines in step S815 that the "Forward" key has been operated, the following process may be executed in place of incrementing the pointer. That is, the CPU 2001 determines whether another text-type input item is present. If another text-type input item is present, the CPU 2001 executes the following process: in place of step S816, the CPU 2001 stores the data that has been input in the text buffer area serving as a temporary storage area in association with an input item that has been input. In this case, the program switches to step S819 without executing the process of step S818.

A description of the "Back" key will be omitted because it is similar to the "Forward" key.

The operation of opening and closing the software keyboard by the user can be decreased using the priority information data (REQUIRE/OPTIONAL) shown in FIG. 5.

For example, if the CPU 2001 determines in step S815 that the "Forward" key has been operated, the following process may be executed in place of incrementing the pointer. That is, first the CPU 2001 determines whether another input item in which priority information is "Required" is present. If another input item in which priority information is "Required" is present, the CPU 2001 stores the data that has been input in the text buffer area serving as a temporary storage area in association with the input item name that has been input, in place of step S816. In this case, the program switches to step S819 without executing the process of step S818.

On the other hand, if another input item in which priority information is "Required" is absent, the CPU 2001 determines whether another input item in which priority information is "Optional" is present. If another input item in which priority information is "Optional" is present, the CPU 2001 stores the data that has been input in the text buffer area serving as a temporary storage area in association with the input item name that has been input in place of step S816. In this case, the program switches to step S819 without executing the process of step S818.

If neither "Required" input item nor another "Optional" input item is present, the CPU 2001 executes the same process as for the "OK" key shown in FIGS. 7A and 7B. That is, the CPU 2001 stores the data that has been input in the text buffer area serving as a temporary storage area in association with the input item name that has been input, in place of step S826. Subsequently, the CPU 2001 executes steps S827 and S828.

Similarly, the above operations may be applied to a case in which the "Back" key is pressed, thus, its description will be omitted.

The item input screen 101 in FIG. 8 of this example provides the same functions as the item input screen 101 of the related art, which displays the text entry fields and options of attributes to be selected using pull-down menus. A software keyboard 110 is displayed when the text entry field ("Document name") on the item input screen 101 is pressed, so that text data can be input in a text display area 1101 of the software keyboard 110. The software keyboard 110 displays input item information ("Document name" and "Required"). The software keyboard 110 also displays a Forward key 1100. The user inputs text in the text buffer for displaying it in the text display area and thereafter presses the Forward key 1100. When the Forward key 1100 is pressed, the input item information switches from "Document name" and "Required" to "Comment" and "Required", with the software keyboard kept displayed (FIG. 9). Thus, the text buffer that is held to display the data in the text buffer in the text display area switches to a text buffer for inputting text for the input item "Comment". A software keyboard 111 of the input item "Comment" displays a Back key 1110 and a Forward key 1111. When the Back key 1110 is pressed, the software keyboard 111 shifts to the software keyboard 110 of the previous input item "Document name", with the software keyboard kept displayed. Thus, the data in the text buffer that is held to display the data in the text buffer in the text display area switches to the text buffer for inputting text for the input item "Document name". When the Forward key 1111 is pressed, the information of the input item switches from "Comment" and "Required" to "Keyword" and "Optional", with the software keyboard kept displayed. Thus, the data in the text buffer that is held to display the data in the text buffer in the text display area switches to a text buffer for inputting text for the input item "Keyword" (FIG. 10).

Figure 11:
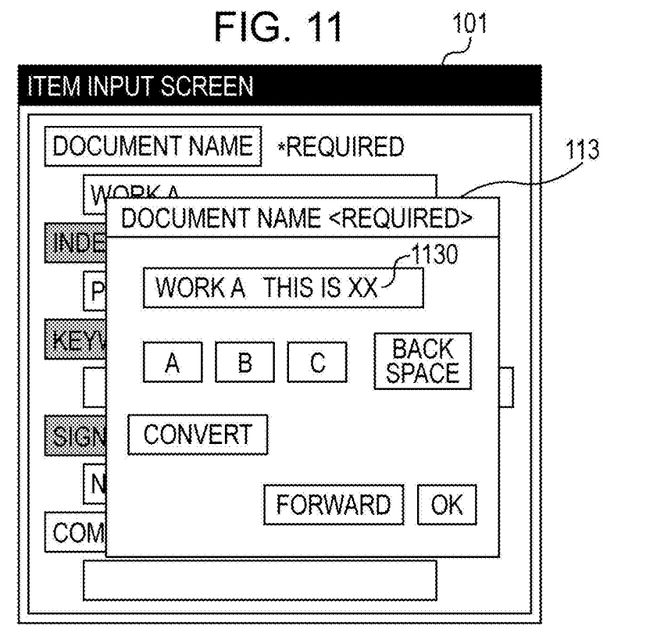
FIG. 11 shows a software keyboard for inputting text-type data of the invention is displayed.

Reference numeral 113 in FIG. 11 denotes a software keyboard of the input item "Document name" that is displayed when the Back key 1110 is pressed (the same as the software keyboard 110 of the input item "Document name"). In this case, a value that was previously input in the text buffer for displaying it in the text display area is input in advance in a text display area 1130 as an initial input value.

Reference numeral 112 denotes a software keyboard of the input item "Keyword" that is displayed when the Forward key 1111 is pressed.

All of the software keyboard 110 of the input item "Document name", the software keyboard 111 of the input item "Comment", and the software keyboard 112 of the input item "Keyword" display the following items in common: an input item name 1120 and priority information 1121 indicative of whether the input is required or optional. The software keyboards 110 to 112 also display a text display area, text input keys, a conversion key, and an OK key for confirming data stored in the text buffer to undisplay the software keyboard.

The software keyboard 112 shows only a Back key 1122 because no next input item is present.

Although the Forward key and the Back key are displayed on the software keyboards, the invention is not limited to that. Those keys may be provided at a location other than the software keyboards. In this case, the Forward key and the Back key are not displayed in step S809 and S811 as follows: Entry of the Back key is invalidated in step S809. Even if the Back key is pressed, the entry may be ignored or a warning that the entry is invalid may be issued. Likewise, entry of the Forward key is invalidated in step S811. Even if the Forward key is pressed, the entry may be ignored or a warning that the entry is invalid may be issued.

The invention can be achieved by providing a storage medium (or a recording medium) that stores program code of software that implements the above functions to a system or unit. The invention can also be achieved when the computer (or the CPU or MPU) of the system or unit reads the program code stored in the storage medium and implements it.

In this case, the program code itself that is read from the storage medium implements the above-described functions of the embodiments, and the storage medium that stores the program code constitutes the invention. The above-described functions of the embodiments are implemented by executing the program code read by the computer. In addition, an operating system (OS) that operates on the computer according to an instruction of the program code can implement part or the whole of actual operations. This invention also includes implementing the functions of the embodiments by the operations.

Furthermore, when program code read from the storage medium is written to a feature expansion card inserted in the computer or a storage medium provided in a feature expansion unit connected to the computer, the functions of the embodiments are implemented as follows: a CPU or the like provided in the feature expansion card or the feature expansion unit implements part or the whole of actual operations, by which the above-described functions of the embodiments are implemented.

When the program code of the software that implements the functions of the embodiments is distributed via a network, the program code is stored in a storage device of a system or unit, such as a hard disk or a memory, or a storage medium, such as a CD-RW, CD-R, or a USB memory. The functions are also implemented in such a manner that the computer (or the CPU or MPU) of the system or unit reads the program code read from the storage device or the storage medium and implements it.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An input apparatus comprising:
   a display unit, on which an input screen including a plurality of text entry fields, and a software keyboard are displayed, the software keyboard including first software keys for entering a text in each of text entry fields, and a second software key for changing a target of input to a next text entry field; and
   a control unit configured to determine, in response to a user selecting a first text entry field included in the input screen, the selected first text entry field as a target of input and to cause the display unit to display the software keyboard in addition to the input screen,
   wherein in a case where the user selects the second software key, the target of input changes from the determined first text entry field to a second text entry field included in the input screen, and
   wherein in a case where at least one of the plurality of text entry fields on the input screen is selected as a target of input and the software keyboard is displayed, the second software key on the software keyboard is not displayed.

2. The input apparatus according to claim 1, wherein after the target is changed from the first text entry field to the second text entry field by the second software key, the display unit displays a software key to accept an instruction of changing the target from the second text entry field to the first text entry field in the editing screen including the software keyboard.

3. The input apparatus according to claim 1, further comprising a storing unit configured to store the data input in the text entry fields.

4. The input apparatus according to claim 1, wherein the display control unit causes the display unit to display the editing screen so that at least part of the input screen is hidden by the editing screen.

5. The input apparatus according to claim 1, further comprising an acquisition unit configured to acquire image data using a device included in the input apparatus.

6. The input apparatus according to claim 5, further comprising an editing unit configured to edit the image data acquired by the acquisition unit.

7. The input apparatus according to claim 5, further comprising an acceptance unit configured to accept an instruction to print the image data acquired by the acquisition unit.

8. The input apparatus according to claim 5, further comprising a print control unit configured to control printing to be executed based on the image data acquired by the acquisition unit.

9. The input apparatus according to claim 1, wherein the control based on the text entry fields is control based on a predetermined setting and not on a setting input by a user.

10. The input apparatus according to claim 1, wherein a first input item is displayed between the first text entry field and the second text entry field in the editing screen, and the first input item is input choosing an option from a menu.

11. The input apparatus according to claim 1, wherein in a case where the target of input is a last text entry field, the control unit is configured to perform control not to display the second software key to accept an instruction of changing the target of input from the last text entry field to another text entry field.

12. The input apparatus according to claim 10, wherein when the first input item is displayed between the first text entry field and the second text entry field, the target of input changes from the determined first text entry field to the second text entry field included in the input screen without determining the first input item as a target of input.

13. A method comprising:
   causing to display on a display unit, an input screen including a plurality of text entry fields and a software keyboard, the software keyboard including first software keys for entering a text in each of text entry fields of the plurality of input items, and a second software key for changing a target of input to a next text entry field; and
   determining, in response to a user selecting a first text entry field included in the input screen, the selected first text entry field as a target of input and to cause the display unit to display the software keyboard in addition to the input screen,
   wherein in a case where the user selects the second software key, the target of input changes from the determined first text entry field to a second text entry field included in the input screen, and
   wherein in a case where at least one of the plurality of text entry fields on the input screen is selected as a target of input and the software keyboard is displayed, the second software key on the software keyboard is not displayed.

14. The method according to claim 13, wherein a first input item is displayed between the first text entry field and the second text entry field, and the first input item is input choosing an option from a menu.

15. The method according to claim 14, wherein when the first input item is displayed between the first text entry field and the second text entry field, the target of input changes from the determined first text entry field to the second text entry field included in the input screen without determining the first input item as a target of input.

16. A non-transitory computer-readable storage medium storing a program for causing a computer to execute a method, the method comprising:
   causing to display on a display unit, an input screen including a plurality of and a software keyboard, the software keyboard including first software keys for entering a text in each of text entry fields, and a second software key for changing a target of input to a next text entry field; and
   determining, in response to a user selecting a first text entry field included in the input screen, the selected first text entry field as a target of input and to cause the display unit to display the software keyboard in addition to the input screen, wherein in a case where the user selects the second software key, the target of input changes from the determined first text entry field to a second text entry field included in the input screen, and wherein in a case where at least one of input items including the plurality of text entry fields on the input screen is selected as a target of input and the software keyboard is displayed, the second software key on the software keyboard is not displayed.

17. The non-transitory computer-readable storage medium according to claim 16, wherein a first input item is displayed between the first text entry field and the second text entry field, and the first input item is input choosing an option from a menu.

18. The non-transitory computer-readable storage medium according to claim 17, wherein when the first input item is displayed between the first text entry field and the second text entry field, the target of input changes from the determined first text entry field to the second text entry field included in the input screen without determining the first input item as a target of input.

* * * * *